July 10, 1945.  H. A. BURGESS  2,379,880
HIGH SPEED TELEGRAPH SYSTEM
Filed Oct. 7, 1942   4 Sheets-Sheet 2

INVENTOR
H. A. BURGESS
BY
O. E. Rasmussen
ATTORNEY

July 10, 1945.  H. A. BURGESS  2,379,880
HIGH SPEED TELEGRAPH SYSTEM
Filed Oct. 7, 1942   4 Sheets—Sheet 3

FIG. 3

INVENTOR
H. A. BURGESS
BY
O. E. Rasmussen
ATTORNEY

July 10, 1945.  H. A. BURGESS  2,379,880
HIGH SPEED TELEGRAPH SYSTEM
Filed Oct. 7, 1942  4 Sheets-Sheet 4

INVENTOR
H. A. BURGESS
BY
O. E. Rasmussen
ATTORNEY

Patented July 10, 1945

2,379,880

UNITED STATES PATENT OFFICE 2,379,880

HIGH-SPEED TELEGRAPH SYSTEM

Harry A. Burgess, Chatham, N. J., assignor to Bell Telephone Laboratories, Incorporated, New York, N. Y., a corporation of New York Application October 7, 1942, Serial No. 461,115

19 Claims. (Cl. 178—15)

This invention relates to high speed telegraphy.

It is an object of the invention to provide a high speed telegraph system in which the signals may be transmitted over long distances and the corresponding characters recorded by means of apparatus using a minimum of mechanical operations.

It is a further object of the invention to provide a system of this type as well as a method of high speed recording of signals, in which advantage is taken of the high operating speeds and accurate performance at such high speeds of electronic and optical or magnetic devices.

It is a further object to provide a system of this type in which the message may be originally set up in the usual manner of commercial telegraph messages and with the same speed, but in which the messages are transmitted at very high speeds limited only by the operating speeds of electronic and optical devices.

It is a still further object to provide a signaling system in which the high speed of signaling and the nature of the signals will secure a degree of secrecy of the message while it passes over the transmission channel.

In accordance with a principal feature of the invention the signals from a high speed channel are received by an electronic discharge device, such as a cathode ray tube, in which the projected beam of electrons normally sweeps in a predetermined track in synchronism and phase with the incoming signals and in which the beam or ray is deflected once for each circular sweep by the incoming signals for the purpose of selection.

In accordance with another principal feature of the invention the signals of the letters of the alphabet or other signs or characters are represented in the high speed channel by an impulse with a definite phasing or space relation from the initial time instant of each letter or character cycle, so that upon arrival at the receiving cathode ray tube the beam will be deflected after having traveled an angular distance around its predetermined path corresponding to the phasing or position of the received impulse within its cycle. The deflected beam thus is enabled to select a character for recording corresponding to the transmitted character.

In accordance with a more specific feature of the invention the cathode ray tube is provided with a circular plate or screen placed in the circular path of the beam to normally prevent the beam from passing beyond this screen. The plate has a series of differentiated areas arranged in a circle concentric with the normal circular path of the beam but of a different diameter. These areas have perforations or stencil cut-outs differently shaped to form letters or signs or other characters and the cut-out portions permit the beam to pass beyond the plate. Whereas in the preferred form the beam is initially produced with a shape to form a small circular spot upon the plate, the beam will be shaped in passing through the stencils to throw an image or shadow on a fluorescent screen at the end of the tube which will have an outline corresponding to the contours of the perforations in the screen. The letters or characters may be read on the fluorescent screen on a circle along its periphery or may be optically recorded at high speed.

In accordance with a still more specific feature of the invention the beam after passing through the cut-outs is deflected to continually strike in a central spot on the fluorescent screen so that all successive characters will be readable at this spot for recording.

In accordance with a still more specific feature of the invention the beam deflected as just described is subjected to a transverse deflection so that successive characters will be made optically visible at successive points along a straight line across the fluorescent screen for page recording. For this purpose, the circuit includes means for producing a linear static field and for varying the field strength by a certain amount during each signal and for cyclically restoring the field strength to its starting value upon reception of a predetermined number of signals, which thus will permit printing of the message in parallel lines of a predetermined length.

The invention will now be described more in detail as applied to a commercial transmission system including several distinct features; it should, however, be understood that the invention is not limited to the particular embodiment disclosed hereinafter, and that its scope is defined by the appended claims.

In the following detailed description reference will be made to the accompanying drawings showing schematically the essential elements of a complete telegraph system embodying the features of the invention and in which:

Fig. 3 shows a schematic circuit arrangement for receiving the high speed signals and shows a diagrammatic view of a cathode ray tube partly in perspective and including various control elements;

Figure 3A:
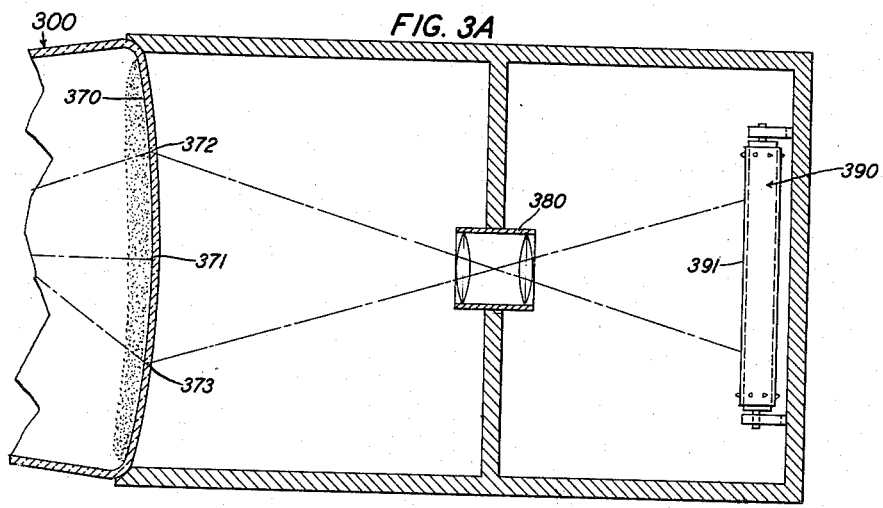
Fig. 3A shows a suitable camera for recording the message at high speed.
Figure 5:
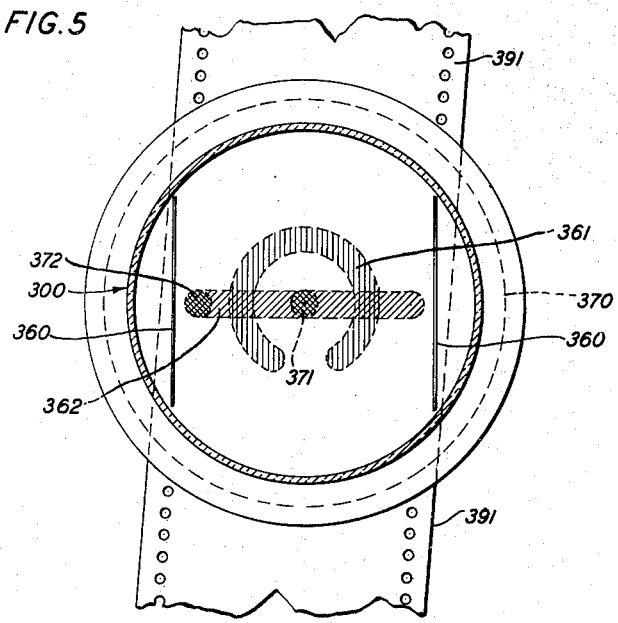
Figure 6:
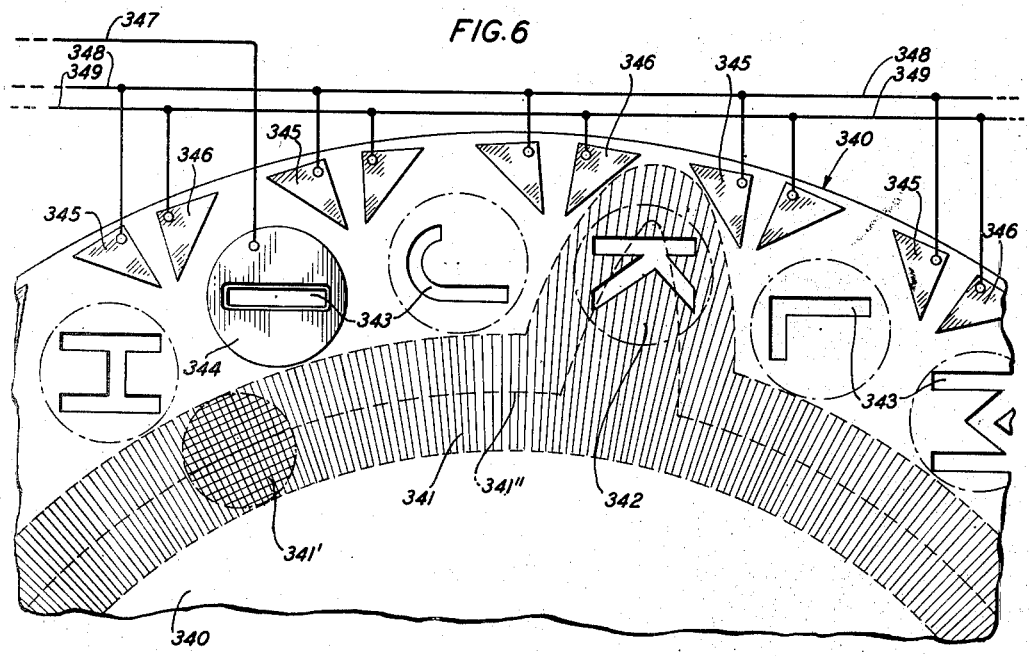

Fig. 5 is a cross-sectional view taken on line 5—5 in Fig. 3 through the cathode ray tube, and includes the printing record; and Fig. 6 is a detailed view of the stenciled screen used in the cathode ray tube for producing the letters of the alphabet or other desired characters. This figure also includes a simplified showing of equipment for lining up the system at starting and for maintaining synchronism during operation.

Figure 1:
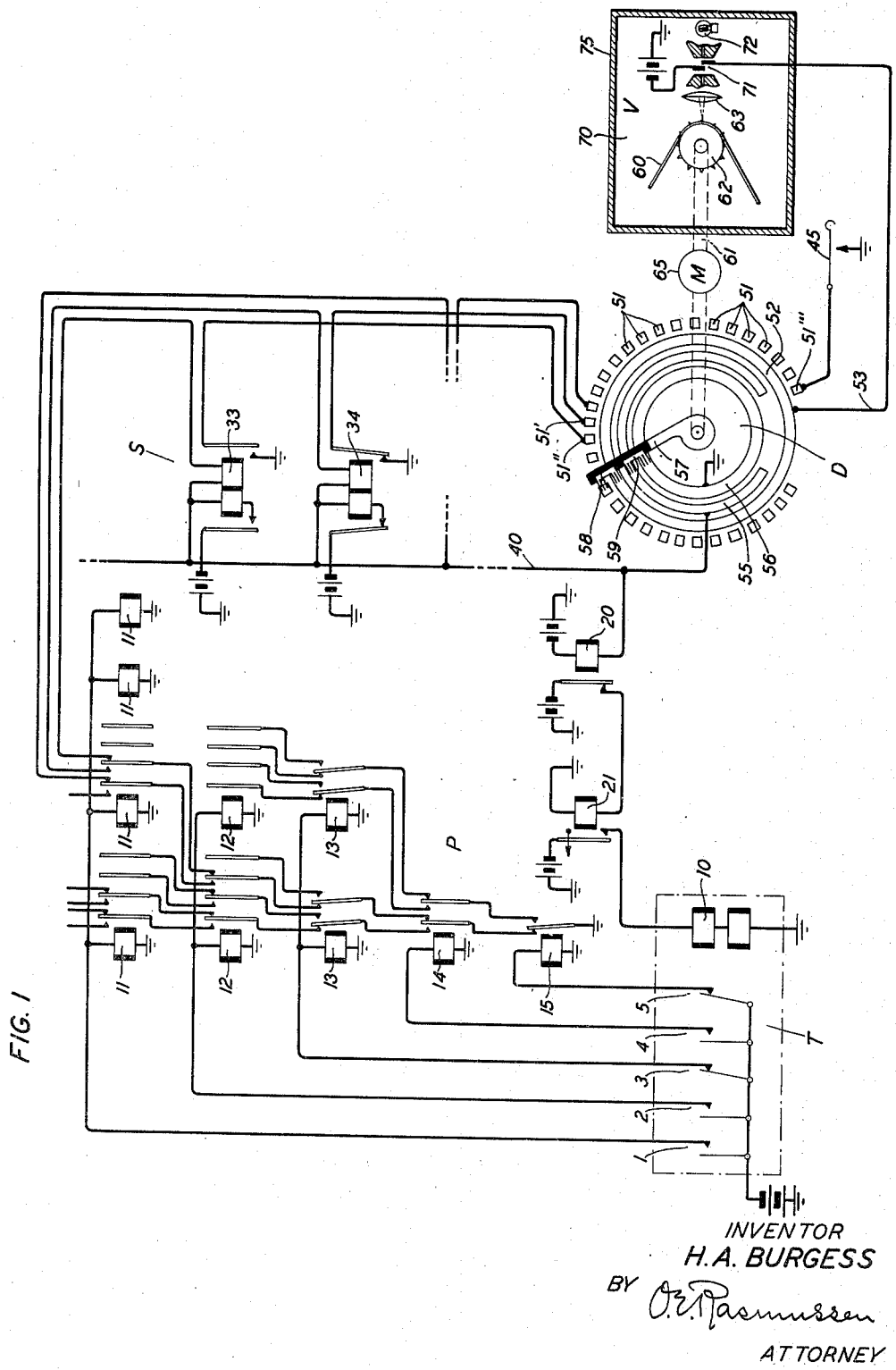
Fig. 1 shows diagrammatically a transcription equipment for producing the original message in recorded form for retransmission over a high speed channel.

Referring now more particularly to the diagram shown in Fig. 1 the initial recording system shown in this figure is adapted for control by a perforated message tape, generally of the type used in commercial telegraph practice, for the production of a magnetic or optical record on a wire or tape better adapted than a perforated tape for high speed transmission of the message.

The system shown in Fig. 1 includes a tape transmitter T, a set of permutation relays P, a set of storing relays S, a continuously rotating distributor D and a recording light valve V.

For the sake of simplicity in disclosing the features and operating principles of the invention, it will be assumed that the system is adapted for transmission of thirty-two different letters or characters so that the message as originally recorded on the perforated tape may be based on the five-unit code. It should, however, be understood that the system may readily be adapted for transmission of the usual letters of the alphabet and the usual number digits and it may even be adapted to also include various signs and arbitrary function signals such as shift and unshift, space, line feed, etc. In such case, it would, of course, be necessary to use a six or seven-unit code for producing the perforated tape with the original message, or to use the five-unit code some case shift arrangement.

It should furthermore be understood that in case the original message may be recorded at comparatively slow speed in the form it is needed for the high speed transmission, it is not necessary to first produce a perforated record tape, but the keyboard may be provided with permutation bars and transmitting contacts which will be locked upon operation by the keys and will be unlocked automatically by the system for resetting. Such a keyboard would replace the transmitter T in Fig. 1. In this case, the speed must be low enough to permit the operator to operate in unison with the automatic unlocking operation. A transmitting device of this kind is shown in Fig. 179 in a book by H. H. Harrison entitled "Printing Telegraph Systems and Mechanisms," and issued by Longmans, Green and Company, New York, in 1923.

If the permutation bars be omitted from the keyboard and each key provided with sending contacts the keyboard would replace both the transmitter T and the permutation relays P shown in Fig. 1 and its contacts would be connected directly to the storing relays S.

The objects of the circuit shown in Fig. 1 may be attained in a variety of other well-known ways. However, since this part of the system does not include any feature of the invention it is not believed necessary to further describe such alternative forms or to illustrate in the drawings those referred to above.

The circuit shown in Fig. 1 has the advantage of being adapted for operation at speeds approaching the speed of transmission in the teletypewriter plant.

For the purpose of operating the system shown in Fig. 1, the perforated tape may be prepared by a tape puncher such as that shown in Fig. 166 in the book by Harrison referred to above. The prepared tape is inserted in the transmitting device T which may be of the type generally known as an automatic transmitter which is extensively used, for example, in the multiplex telegraph system. A transmitter of this type is shown in Fig. 179 in the book by Harrison referred to above. The transmitter includes five sending contacts 1, 2, 3, 4, 5 and a resetting magnet 10 for advancing the tape from character to character. For a code of six or seven units, the transmitter should, of course, be provided with six or seven sending contacts.

As shown in Fig. 1, the sending contacts are connected to a set of permutation relays P with contacts for operating any selected one of the storing relays S. The storing relays are adapted to be self-locking and to ground a segment on the distributor D for control of the recording device V. There is one storing relay for each character in the alphabet used in the system.

The distributor D has a number of circular contact tracks and a contact arm which is motor-driven at constant speed in any suitable manner by a driving means 65. The distributor has a series of short segments 51 each connected to the grounding contact of a storing relay and cooperating with an annular contact ring 52; a contact brush 58 on the distributor arm 57 connects the ring 52 to the segments 51 in succession. The segments 51 are distributed over the complete circle of the distributor, except over an angular portion of a width equal to the width of a few of the segments 51, say about six segments. Each segment 51 is about half the width of the center spacing between the segments. A pair of control rings 55 and 56 are interconnected by means of the brush 59 on arm 57. The ring 55 is interrupted in the angular space from which the segments 51 are omitted, as just described.

The distributor shaft 61 is directly connected or geared to a driving sprocket 62 in the recording device V. The driving sprocket 62 is for feeding a recording strip 60, such as a photographic film, with a continuous speed before an optical recording device 70. The device 70 is of the type known as a light valve in which an electrically operated shutter arrangement 71 controls a light beam from a light source 72 in response to incoming impulses. The light beam is projected through the shutter 71 and is projected by a suitable lens system 63 upon the photographic film 60. The light recording system is properly enclosed in a light-proof enclosure 75.

The recording equipment shown in Fig. 1 may be briefly described as operating as follows:

It will be assumed that the storing relay 34 has already been operated and, therefore, is locked up over a circuit from battery through its left-hand make contact, left winding, conductor 40 and over distributor rings 55 and 56 to ground; relay 34 at its right-hand make contacts applies ground to segment 51' for recording of a character on the film 60.

The stepping relay 20 is also locked over the rings 55 and 56 to ground.

The transmitter T will be assumed to have received a new setting from the punches in the perforated tape in accordance with which contacts 3 and 5 are closed. Accordingly, battery is applied over contacts 3 and 5 to the windings of permutation relays 13 and 15; the remaining permutation relays are unoperated. With relays 13 and 15 opearted, a grounding circuit may be traced from ground at the armature of relay 15 over a make contact, over a break contact of relay 14, a make contact of relay 13 and break contacts of relays 12 and 11 through the right-hand winding of storing relay 33 over conductor 40 to battery through the winding of relay 20. Relay 33 is prevented from operating in this circuit by the ground from rings 55 and 56 placed on the conductor 40.

The recorder circuit is, therefore, conditioned for recording of the character set up in the transmitter T.

Figure 4:
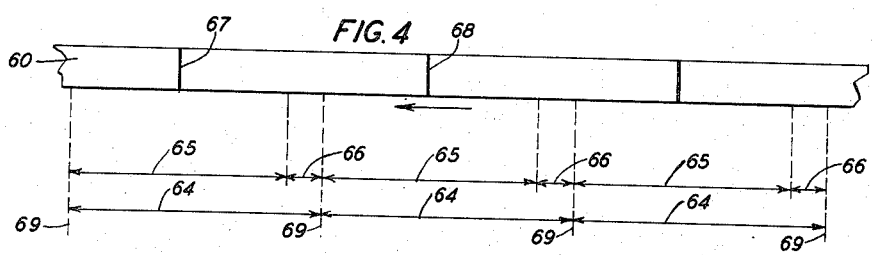
Fig. 4 shows a sample portion of the recorded message used at the transmitting station.

As the distributor arm 57 rotates, the brush 58 will engage segment 51' and thereby apply ground over the ring 52, conductor 53 and through the operating circuit of the light valve 70 to battery. During the brief passage of the brush over segment 51' the shutter 71 will open and admit light to the traveling film 60. The result will be that the film 60 will receive a distinct image of the shutter 70 which may be in the nature of a narrow strip across the film. A portion of the film 60 is shown in Fig. 4.

Immediately after the brush 58 has passed over the last segment 51 the brush 59 will leave the segment 55 and thereby remove ground from conductor 40. The holding circuit is, therefore, opened and the relays 20 and 34 are released. At the same time, the short circuit for relay 33 is removed and relay 33 is operated by its right-hand winding over the winding of relay 20 almost simultaneously with the release of the previously operated storing relay 34. Relay 33 now applies ground over its right-hand make contact to segment 51".

Relay 20 in releasing connects battery to magnet 10 of transmitter T which operates to disengage the sending contacts from the tape.

As soon as relay 20 has released, the brush 59 again reaches the segment 55 and applies ground to conductor 40 for locking relay 33 to its left-hand winding and armature and for reoperating relay 20.

The reapplication of ground to conductor 40 may be timed so that there will be sufficient time for the complete operation of transmitter magnet 10 but also so that the selected storing relay will be locked before the opening of contacts in transmitter T causes the release of permutation relays 11 to 15; thus the operating circuit for the selected storing relay may be maintained over the contacts of the permutation relays until the locking circuit is provided from the distributor.

It may be observed that relay 20 is conditioned so that it will not operate through any right-hand winding of the storing relays to ground at the permutation relays. The transmitter T being comparatively slow in operation, it may be desirable to introduce a slow-acting relay 21 for temporarily maintaining battery on the operating circuit for the magnet 10 to insure its complete operation, even though relay 20 is quickly reoperated.

Upon operation of relay 20 and release of relay 21 magnet 10 is released for advancing the tape and resetting of the contacts under control of a new row of perforations. In consequence, a new setting is impressed on the permutation relays which then prepare the selecting circuit for a storing relay which in this case may be assumed to be relay 33 which already has been selected. In the meantime, brush arm 57 has been traveling over segments 51 and in reaching segment 51" ground is applied to the light valve 70 for a new recording on the film 60. When the brush arm passes over the last segment 51 ground is again removed from conductor 40 for release of relay 20. In this case, relay 33 will not be released but stays locked over its two windings in series and over the ground at the permutation relays. Shortly thereafter, the locking ground will again be applied to conductor 40 thereby locking relay 33 over its left-hand winding only and reoperating relay 20. The transmitter 10 is, therefore, again operated for advancing the tape and resetting of its contacts and for resetting of the permutation relays, which operations all take place while the brush 58 tests the contacts 51 for a ground applied by the preceding setting.

It will be seen that the segments 51 in the distributor are distributed over their whole circumference of the distributor except for a short distance which may be the width of five or six segments. While the brush arm 57 travels through one revolution the film is traveling through a unit distance 64, as indicated in Fig. 4. The location on the film of this distance may be chosen arbitrarily but for convenience may be considered as beginning when the brush 58 reaches the first segment 51. The portion 65 on the film of each unit distance corresponds to the time of travel of the brush 58 over the thirty-two segments 51 and the portion 66 corresponds to the open space from which segments 51 have been omitted and which is used for control functions. The light strip across the film will be placed at a predetermined distance from the starting time 69 for each unit space, as determined by the position of the selected segment 51 on the distributor. Thus, in response to the operation of storing relay 34, a mark 67 will be placed across the film a certain distance from the starting time 69. During the next cycle, a mark 68 will be placed across the film due to the operation of relay 33 which will be slightly closer to the starting time 69, etc.

Upon completion of a message or upon exposure of any desired length of film, the film 60 is removed and developed.

In the case that magnetic recording should be preferred, the circuit from the distribtuor ring 52 would be extended to a recording magnet for reception of the impulses and the recording magnet would make brief magnetic impressions on a traveling narrow magnetic tape or wire, as is well known in the art.

The film 60 is now inserted in the high speed transmitting system.

Figure 2:
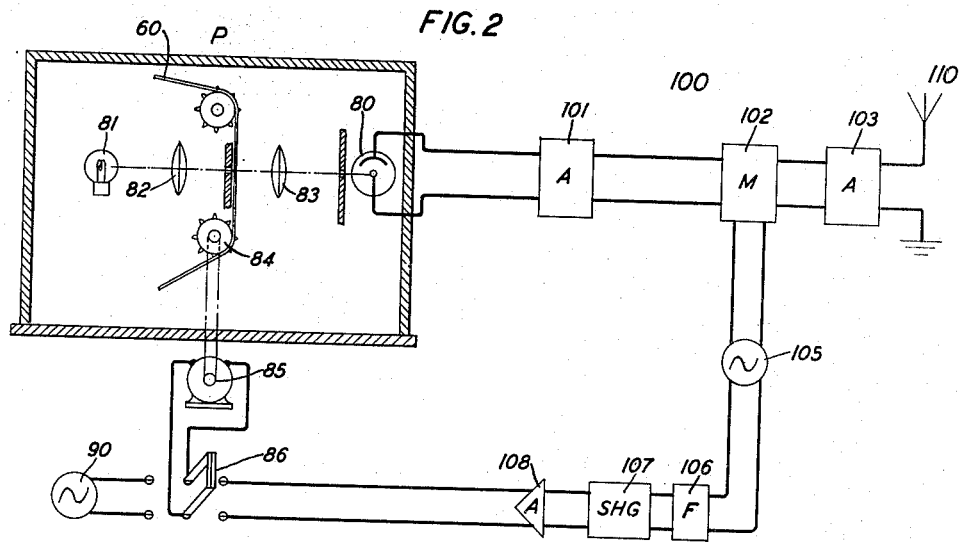
Fig. 2 shows a schematic circuit arrangement for transmission of the recorded message at high speed over a radio channel.

This system is shown in Fig. 2 and includes a projector P and a radio transmission system 100.

The projector P includes a light source 81 and mechanism for passing the film 60 at high uniform speed through the projector, including a sprocket wheel 84 driven by a motor 85. A beam of light from the source 81 is focussed by a lens system 82 upon the film to illuminate a narrow strip across the film. As the film travels, the light will momentarily pass through the narrow transparent portions representing the characters and be focussed by a lens system 83 upon a photo-electric device 80. These elements are mounted in a light-proof enclosure 88.

The electrodes of the photoelectric cell 80 are connected in the input circuit of the radio transmitting system 100 which may be designed in any suitable manner and would usually include an amplifier 101, a modulator 102 and a carrier frequency amplifier 103 connected to an antenna circuit 110. The carrier frequency for the system may be derived from an oscillator circuit 105 which also is connected through a filter 106, a subharmonic generator 107 and an amplifier 108 to supply a subharmonic frequency over the switch 86 to the motor 85 for driving of the film at a uniform linear speed having a predetermined ratio to the output frequency from antenna 110.

The radio signals will be received at the receiving station (Fig. 3) by the receiving system 200 and impressed upon the cathode ray tube 300 for recording.

The incoming signals will be intercepted by the antenna 210 and will pass through a radio receiving circuit 211 and a detector circuit 212. From the detector the signals are passed through a suitable amplifier equipment 213 to the circuit 214 for control of the printing. A portion of the signal current is passed through the amplifier equipment 230 to the circuit 213 for control of the character spacing in the printer. The branch circuit 216 connected immediately behind the detector 212 leads through a filter 221, a subharmonic generator 222 and an amplifier 223 over switch 224 to the rotary sweep circuit 225 of the cathode ray tube 300.

The cathode ray tube 300 is of the general type disclosed in United States Patents 2,214,019, of September 10, 1940; 2,254,036, of August 26, 1941; 2,257,795, of October 7, 1941; 2,260,313, of October 28, 1941; all issued to F. Gray.

In the present embodiment, the tube includes the electron gun 310, the sweep system 320, the signal electrodes 330, the character stencil plate 340, the beam centering electrodes 350, the character spacing electrodes 360 and the fluorescent reading screen 370.

The electron gun 310 includes a heated cathode 311, a beam-shaping and accelerating electrode 312 and a circular focussing magnet 313. Suitable potentials are placed on these electrodes in accordance with known practice. By this means the beam may be given a well defined circular cross section and may be shot with high speed toward the center of the fluorescent screen 370.

The rotary sweep system 320 may be arranged in any desired manner to deflect the beam and cause it to travel in a conical path, with a fixed vertex angle and to produce an invisible circular spot on the plate 340 which normally travels in a circle concentric with the center of the plate. As shown in the drawings the sweep system includes two sets of plates 321 and 322 arranged to provide two oscillating electrostatic fields at right angles to each other, through which the beam passes; the two fields oscillate at 90-degree phase angles with each other and combine to produce the desired sweep of the beam. The potentials applied to the plates 321 and 322 and their phase relation are established in any well-known manner by the sweep circuit 325. For various types of such sweep circuits reference may be had to British Patent 212,305, complete accepted March 6, 1924. It is understood, however, that the frequency of the sweep circuit should be such that the beam is caused to travel through a complete cycle once for each signal period of the incoming signals. Other types of sweep circuit may be used, for example that shown in Gray Patent 2,254,036 cited above.

The character stencil plate 340 has a plurality of stencil cuts 343 representing the various symbols or characters used in the operation and arranged in a circle near the periphery of the plate. The angular spacing between adjacent character cuts 343 is equal to the spacing between segments 51 in the distributor D and characters are omitted from a portion of the circle corresponding to the open space in the distributor where segments 51 are omitted. There will thus be one stencil cut for each segment 51. The plate 340 is of any material that will be opaque to the electron beam and thus may be of metal; in the preferred embodiment it is of insulating material.

Cooperating with this plate are the signal electrodes 330 comprising a central rod 331 and an annular electrode 332. These electrodes are connected over the circuit 214 to receive static potentials due to the amplified incoming signals, thereby setting up a radial static field directed transversely of the circular path of the electron beam. The static field is produced during a short interval corresponding to the width of the segments 51 in distributor D and acts to deflect the beam radially through an angle dependent upon the strength of the amplified signal impulse. Therefore, the beam sweeps continuously over its circular path, striking the plate 340 along a circle just inside the row of stencil cuts 343, and may at any time be deflected by the establishment of the radial field to strike a particular stencil cut corresponding to a particular segment 51 in the distributor, returning to its circular path immediately after the impulse has ceased. The beam will thus be instantaneously projected past the plate 340 through the stencil cut and will have its cross-sectional area shaped or outlined by the shadow of the stencil cut. It should be understood that an adjustable biasing potential may be continuously applied to the signal electrodes for accurate control of the normal sweep circle on the stencil plate 340 and that this biasing potential may be momentarily added to or detracted from by a voltage controlled by the signals for the selection of stencil cuts.

Fig. 6 shows a portion of the stencil plate 340 more in detail. The letters cut 343 in the stencil plate are kept in upright position in order that they may be printed in that position; they therefore take different angular positions in the plate relative to the path of the beam, which is shown as a shaded area 341. For this reason the beam is preferably given a circular cross section, as shown at 341', in order that the letters may be completely covered by the beam in any of their angular positions. In the figure the beam is shown deflected to strike the letter K. The path of the center of the beam is indicated by the dotted line 341". The beam may be made to travel in a curved path during the deflection, as shown at 342, so that it will completely cover the letter during its outward and inward stroke. The particular path during deflection may, of course, be shaped as desired by shaping of the amplified impulses from the receiving circuit in order that any desired effect upon the fluorescent screen may be obtained for proper recording of the characters.

The plate 340 carries a number of targets in the nature of metallic segments or deposits, such as a target 344 about the letter I, which is used for lining up the system at starting, and triangular targets 345 and 346 for maintaining synchronism during operation, as will be described hereinafter. These plates may be in the nature of deposits on the insulating material of the plate 340 and are connected by suitable conductors arranged on the back side of plate 340 and leading through a starting circuit 240 and a synchronizing circuit 250 to the rotary sweep circuit 225.

The concentric electrodes 351 and 352 comprising the character centering electrode 350 are connected to a suitable source of potential to establish a steady radial electrostatic field. Whenever the beam is deflected by the electrode 330 to pass through a character stencil in disc 340 the shaped beam in passing between the electrodes 351 and 352 will be deflected to the center point 371 on the fluorescent screen 370 no matter at what point of the circular path the beam selects a letter. The letters may thus be read in succession at the point 371 on the screen and may be observed by a suitable optical arrangement 380 (Fig. 3A) for printing on a photosensitive surface 391 in a continuous line. In this case the recording tape 391 should be moved at uniform speed in a direction at right angles to the upright direction of the letters appearing on the screen 370.

However, for the purpose of printing the message in page form, a pair of letter spacing electrodes 360 is arranged to establish a substantially uniform linear static field at a point between the electrode 350 and the screen 370. The plates 360 should be far enough apart to establish a uniform field at any particular voltage applied to the plates, so that the beam at any point of its circular sweep between the plates will be deflected in a direction at right angles to a line between the plates through a given angle determined by that voltage. For this purpose the plates may be mounted either inside or outside the tube 300.

The object of this arrangement is to shift the illuminated spot 371 produced by the beam on the screen 370 along a straight recording line across the center of the screen in response to a varying voltage on the plates 360.

For a further explanation of this arrangement and its effect, reference will be made to Fig. 5 which is a cross-sectional view of the tube 300 taken along line 5—5 of Fig. 3, looking toward the fluorescent screen 370 and the recording tape 391. In this figure the circular shaded space 361 indicates the area in which the beam will appear between the plates 360, where it will be subjected to the static field. When the static field is zero, a character appearing in the space 361 will continue on until it reaches the center spot 371 on the screen from any part of the area 361. With a certain static field established by a certain voltage on the plates 360 in a given direction, the beam will be deflected, say, toward the left and for a field in the opposite direction it will be deflected toward the right, so that any character instead of striking at the point 371 may be caused to strike at a corresponding point along the linear recording area 362 on the screen on either side of the spot 371. The greater the voltage applied to the plate, the further the character will be deflected from the spot 371 within the area 362. Thus, by controlling the voltage applied to the plates 360 any one character can be focussed upon any one point along the area 362, thereby enabling the spots of successive characters to strike at successive points with a desired spacing along the area 362 on the screen as the voltage is varied.

The composition of the fluorescent material of the screen 370 may be selected, as is well known in the art, to provide a sufficiently low threshold for the fluorescent effect to appear during the very brief energization by the beam with sufficient intensity for recording and also to limit the duration of the luminous effect, so that undue blurring of the image on the continuously traveling record surface at 390 will be avoided. For page printing, the record surface 391 will move at a comparatively slow speed so that the luminous effect for each character may have an appreciable duration. The persistence of the images may thus be equal to the time of more than one signal cycle and be equal to as many as six or eight cycles dependent upon the number of characters in the recording line.

The objective 380 is placed at a sufficient distance to view the entire line 362 on the fluorescent screen and project it upon the surface 391.

The photosensitive surface 391 may be a film for negative printing or a paper for positive printing in the form of a strip of sufficient width to receive a succession of characters in a line across the strip. The strip 391 is moved longitudinally at uniform speed by any suitable means well known in the art. The surface speed is such that during the printing of a line across the strip the strip will have moved the distance between two successive lines. In order to have the lines appear at right angles to the edge of the strip the equipment 390 may be turned at a slight angle from a line perpendicular to the linear area 362 on the screen to offset the effect of the constantly moving strip on the line-up of the characters across the strip.

The operation of the receiving system will now be described.

When the system is started up the carrier will be incoming to the receiving circuit 200 and the subharmonic frequency thereof will be impressed upon the sweep circuit so that the beam will rotate at high speed in unison with the frequency of the sending cycle established for the film 60 at the sending station which, as already stated, also is based on the carrier frequency. In the case where an extensive power system is available for supplying a common frequency or harmonic frequencies with sufficient accuracy at the sending and the receiving stations, it is possible to derive power from such power system for driving the film 60 at the sending station and for controlling the sweep circuit at the receiving station. This alternative arrangement is shown in the drawing as being applicable to the system by throwing the switches 86 and 224 into their alternate positions. In such case the frequency of the carrier would be entirely independent of the signaling frequency.

With the beam properly shaped and focussed and the sweep properly adjusted, the beam spot 341 (Fig. 6) will travel in synchronism with the incoming signals and in a circle immediately inside the character stencils in plate 340. For the purpose of lining-up, the film 60 may have recorded thereon impulse spots or strips, corresponding to a certain character, repeated for a long enough time to permit adjustment of the phase of the beam relative to the incoming character. In the present system the character "I" is selected for this purpose. While the beam is out of phase, it will display different characters on the screen each time an impulse arrives. The phase of the beam may be slightly varied by manual adjustment of the starting circuit 240 (Fig. 3) in any desired manner, well known in the art, and the phasing may be observed by the operator until the letter "I" appears on the screen. However, the correction of the phase at starting may be under control of the beam without the need of observation by the operator. For instance, a variable phase shifter may be included in the two-wire or single phase portion of the rotary sweep circuit 225 and its adjustment arranged to be controlled by handle 241 through the medium of an electromagnetically operated clutch, so that when current is passed through it the clutch becomes disengaged. Thus, when the beam approaches correct phasing, it will strike the disc 344 placed around the stencil cut for the letter "I" and thereby send an impulse over the start circuit 347, which will disconnect the control handle 241 for the manual adjustment from the starting circuit; the starting circuit thus will be left in the proper phasing condition.

Fore more accurate correction of the phasing and maintenance of synchronism the arrangement of the plate 340, as shown in Fig. 6, includes the "fast" and "slow" segments 345 and 346 which are arranged next to each of the letter stencils, or to some of the stencils as desired, and are connected over the "fast" and "slow" circuits 348 and 349, respectively, to the synchronizing equipment 250 (Fig. 3) associated with the rotary sweep circuit 225. The segments 345 and 346 are arranged at opposite sides of each character stencil and immediately adjacent to the correct track occupied by the beam when it is correctly deflected and in correct phase.

To consider the condition during starting after the beam has been sufficiently phased to show the letter "I" by striking the disc 344, the beam may still strike one or the other of the targets 345 and 346 associated with the letter "I." Assuming that the beam is fast, it will send impulses over the segment 345, conductor 348 and into the synchronizing circuit 250. Each impulse may establish a change in the circuit conditions of the phase controlling equipment which may be of sufficient duration to be effective when the next impulse arrives in retarding the phase of the beam. The beam may thus be gradually retarded by successive impulses until it no longer touches the target 345 and the tendency for the beam to advance in phase will be counteracted every time it strikes the target 345. The target 346 has a similar though opposite effect on the phasing equipment of the sweep circuit, in order to advance the phase of a slow beam until it clears the target 346. This correcting action for maintaining synchronism will, of course, be effective with any letter where the targets 345 and 346 are provided, and during normal operation.

Thus, for the starting conditions the phasing equipment may include a coarse phase adjustment in the starting circuit 240 and for maintaining synchronism the phasing equipment may include a more sensitive equipment in the synchronizing circuit 250 for fine adjustment of the phase. Whereas the coarse adjustment is made manual and is merely disconnected by the starting target 344, the fine adjustment controlled by the fast and slow targets may include a phase adjustment by control of the saturation of an inductance used as a phase shifter so that the impulses cause a change in inductance which advances or retards the phase of the beam, in a manner known in the art. The circuits 240 and 250 may, of course, also include amplifying equipments for making weak controlling impulses sufficiently effective.

At starting, the potential applied to the beam centering electrodes 350 is adjusted in the circuit 217 (Fig. 3) until the ray is properly centered on the screen 370.

The circuit 215, shown in Fig. 3, for controlling the character spacing electrodes 360 will ordinarily be fixed in proper condition for providing a desired character spacing and a desired length of line. However, before the message arrives the key 238 should be closed to temporarily discharge the condenser 233 (if it has a charge) and placed the potential of the suitably grounded battery 235 on one of the electrodes 360 so that they will be in condition to deflect the beam to the beginning of the printing line on the screen 370, namely, to the spot 372 (Fig. 5).

When the first impulse of the message arrives, it will be amplified by amplifier 213 and impressed upon the character selecting electrodes 330. The beam will be deflected at this time for a brief instant to pass through the particular stencil cut which is placed at a phase angle within the beam sweep equal to the phase angle of the impulse within the signal cycle, and will thereafter return to the circular path for the remainder of the cycle. The deflected path for selection of the character "K" is indicated in Fig. 6.

While being shot through the stencil cut the beam passes into the centering field of the electrode 350 and thereafter into the field of the character spacing electrodes 360, where it is deflected toward the left to the beginning of the line area 362 (Fig. 5), at which point the luminous effect produced by the beam will be observed by the camera and impressed on the traveling surface 391. A portion of the amplified impulse current passes to the impulse storing circuit 215, charging the small condenser 231 for its duration. Thereafter the condenser 231 discharges comparatively slowly into the large condenser 233 which requires a small potential opposed to that of battery 235, so that the tendency of the electrodes 360 to bend the beam toward the left will be reduced enough to cause the next character to clear the spot at which the first character appeared. The condenser circuit must therefore be designed so that the small condenser 231 will receive its charge during a small fraction of the signal cycle, and will discharge into the storing condenser 233 in the minimum available time between impulses, which will be determined by the impulse-free period of each signal cycle, as in turn controlled by distributor D (Fig. 1).

When the next impulse arrives, it is impressed on the circuit 214 to again deflect the beam, perhaps at a different point of the circular path on disc 340 for recording of a different character, and the beam will strike the screen 370 to make the new character visible with a proper shift relative to the preceding character. The second pulse also passes into circuit 215 and recharges condenser 231. Upon cessation of the impulse condenser 231 again discharges into condenser 233 to further increase its voltage and to further reduce the angular deflection of the beam for the next character.

This process will continue in the manner described, causing the condenser 233 to increase its potential to about twice the potential of battery 235 at which time the potential is sufficient to break down the gas-filled tube 234 for complete discharge of condenser 233; this will happen after a character has been displayed at the right end of the line area 362, which was produced by the same impulse that causes the breakdown of the tube 234 upon its cessation.

When now the next character arrives the beam will again strike at the left end of the printing area 362 on the screen 370 and will be photographed at the beginning of a line on the surface 391. This surface in the meantime having moved a distance corresponding to a desired line spacing, the printing will now proceed along a new recording line.

In the case of a function signal, such as "space," it is of course not desirable to produce any record, for which reason there will be no stencil cut in disc 340 corresponding to the phase angle of such a signal. Thus upon reception of such a signal the beam will be deflected from its circular path without making a record and the condenser 231 in circuit 215 will be charged as for any other signal, so that the beam for the next character will be shifted two spaces along the printing line and a "space" will be inserted in the record.

During the continued operation exact synchronism with the incoming pulses will be maintained by the circuit 250 which will receive correcting pulses from the fast and slow targets any time the beam tends to strike the letter stencils incorrectly; the stencils are cut accurately to have their centers in correct phase with the centers of the corresponding incoming pulses of the message when they arrive with the correct speed. By adjustment of the strength of the incoming voltage impulses in the circuit 214, the radial deflection of the beam may be increased so that it normally will strike both the fast and slow targets; in such case a differential effect by the impulses from any pair of targets may be utilized to control the synchronization, one pulse being longer than the other when the path of the beam becomes unsymmetrical with respect to the targets.

Upon completion of a message the exposed portion of the paper or film 391 is removed and developed.

It will thus be understood that the system as described above and shown in the drawings is capable of transmitting signals for telegraphic purposes at extremely high speeds, since the recording at the receiving end is not dependent upon mechanical operations that will affect the speed of the signals. This fact in itself will contribute materially to the secrecy of the system. Furthermore, the selectivity of the signal impulses is based on a phase relation relative to a starting instant of each cycle, which is not positively demarcated in the transmission, but is only initially established by cooperation between the two end stations. This fact in combination with the extremely high speed would make unauthorized decoding of the message difficult.

It should be recognized that other circuit arrangements may be provided for control of the stepwise variation of the static field between the spacing electrodes without a departure from the invention. Thus, in accordance with an alternative arrangement, a control impulse may be impressed upon the impulse storing circuit 215 by the beam once during each rotation, for which purpose a target 236 may be placed on the stencil plate in the sector corresponding to the impulse free period of the signal cycle. In this case the input side of the impulse storing circuit 215 should be connected over key 239 and conductor 237 to target 236. When in this case the target 236 is placed in the same circle as the stencil cuts, the beam must be deflected to strike the target; for this purpose a special segment 51''' on distributor D (Fig. 1) should be permanently grounded by closing of the key 45 for recording of a second light strip across the film 60 during each signal cycle. Thus the beam will be deflected a second time during each sweep, and this time immediately after having passed the last character stencil. The impulse produced in this manner may be used to advance the spacing of the characters along the printing line, through control of the condenser circuit 215, as described above. This impulse may furthermore be utilized to control the starting circuit, thus obviating the sending of letter "I" and obviating the starting target about the letter "I." A further simplification will be possible with this arrangement, since the synchronizing circuit may be completely controlled by "fast" and "slow" targets disposed adjacent to the target 236, in the manner already described. Since the target will be struck during each cycle the beam sweep would be corrected during each sweep and before the selection of each character. The "fast" and "slow" targets at the stencil cuts would not be required in this case.

It should be understood that for the purpose of suiting specific requirements many other details of the system may be worked out in other ways than those disclosed herein without departing from the spirit of the invention as expressed in the appended claims.

Thus for convenient reading of the message directly on the screen 370 or to suit any particular requirement of the recording and developing process for the recording surface 391, the stencil cuts in character stencil plate 340 may be inverted for direct reading on the screen 370 and the potentials on character spacing electrodes 360 may be so applied that the display of characters along each recording line may be from right to left, as viewed in Fig. 5.

It is, of course, also possible to have the beam sweep in a path immediately outside the circular row of stencil cuts 343 in plate 340 and to apply the incoming impulses with a polarity such as to deflect the beam inwardly for the selection of a character.

Nor is the invention limited to a sweep pattern of circular or nearly circular form on the plate 340. Any other pattern which during each cycle covers all the phase angles used for selection will serve the purpose, the effect of the incoming impulses being merely to so modify the normal sweep as to cause the beam to strike the desired stencil cut.

What is claimed is:

1. A cathode ray tube responsive to incoming signals to visibly display successive characters of a message, said tube comprising thermionic means at one end of the tube for producing a focussed beam with a circular continuous sweep, a reading screen at the other end of the tube, a screening plate for normally preventing the beam from reaching said reading screen and having a plurality of character stencils disposed along a circle concentric with and outside the normal beam sweep, and a pair of concentric selecting electrodes for controlling the path of travel of the beam on the surface of said plate and responsive to said signals to selectively pass the sweeping beam through corresponding character stencils for successive display of the beam with its different stencil outlines on said reading screen.

2. A cathode ray tube in accordance with claim 1 which further comprises a pair of concentric centering electrodes disposed between said plate and reading screen for centering the beam passing through any one of said stencils upon said reading screen.

3. A cathode ray tube in accordance with claim 1 which further comprises a pair of concentric centering electrodes disposed between said plate and reading screen for centering the beam passing through any one of said stencils upon said reading screen, and a pair of parallel spacing electrodes disposed between said centering electrodes and reading screen to establish a uniform linear static field of varying intensity for variably deflecting the centered beam from any one of said stencils for successive display of the characters in spaced relation along a line across said reading screen.

4. A cathode ray tube responsive to incoming signals to visibly display successive characters of a message in lines, said tube comprising thermionic means at one end of the tube for producing a focussed beam with a circular sweep, a reading screen at the other end of the tube, a screening plate for preventing the beam in its normal sweep from reaching said reading screen and having a plurality of character stencils disposed outside the normal sweep and adapted to pass and shape the beam for display of the stencil contours on said reading screen, a pair of concentric selecting electrodes disposed between said thermionic means and said screening plate responsive to said signals to selectively and momentarily deflect the beam to any one of said stencils, a pair of concentric centering electrodes disposed between said plate and reading screen for centering the beam from any one of said stencils upon said reading screen, and a pair of spacing electrodes disposed between said centering electrodes and said reading screen and responsive to said signals for variably deflecting the centered beam for succesive display of the characters in spaced relation along a line across said reading screen.

5. A high speed signal receiving system including a cathode ray tube adapted to normally produce a beam with a circular sweep which comprises a plurality of differentiated operating means arranged in a plane transverse of said beam and in a circle concentric with said beam sweep and a pair of concentric electrodes for selectively and momentarily deflecting the beam from its normal sweep to strike any one of said differentiated means, said system further including signal responsive means connected to vitalize said pair of electrodes for the selective deflection of said beam in accordance with the phase of each signal pulse relative to each signal period.

6. A high speed signal receiving system for receiving signals of differently phased impulses and of constant frequency, said system comprising a cathode ray tube adapted to normally produce a beam with a circular sweep in synchronism with the signal frequency, said tube including a pair of concentric electrodes responsive to said differently phased impulses to momentarily deflect the beam from its normal sweep at corresponding phase angles of the beam sweep for selective operation.

7. A high speed signal receiving system for receiving signals of differently phased impulses and of constant frequency, said system comprising a cathode ray tube adapted to normally produce a beam with a circular sweep synchronized with the signal cycle, said tube including a plurality of symbol producing elements arranged in a plane transverse of the beam and disposed at different phase angles of the sweep along a circle concentric with the beam sweep, and a pair of concentric electrodes coaxial with the beam sweep and responsive to said differently phased impulses for momentarily deflecting the beam from its normal sweep at corresponding phase angles of the sweep to selectively strike corresponding symbol producing elements and produce symbols represented by the incoming impulses.

8. A high speed signal receiving system for receiving signals of differently phased impulses and of constant frequency, said system comprising a cathode ray tube adapted to normally produce a beam with a circular sweep in synchronism with the signal frequency, said tube including opaque screening means adapted to normally prevent the beam from passing beyond said screening means and having a plurality of differentiated areas adapted to pass the beam with different characteristics and disposed at different phase angles of the sweep in a circle concentric with the beam sweep and a pair of concentric electrodes coaxial with the beam sweep for selectively and momentarily deflecting the beam from its normal sweep to modify said beam by passing it through any one of said areas, said system further comprising circuit means connected to impress said impulses upon said electrodes for selective deflection of the beam at corresponding phase angles of the sweep and modification of the beam in accordance with the signals.

9. A high speed signal receiving system for receiving signals of constant frequency and with each signal cycle including only one impulse phased differently in successive cycles to represent corresponding characters of a message, said system comprising a cathode ray tube adapted to normally produce a beam with a circular sweep synchronized with the signal cycle; said tube including an opaque stencil plate arranged transversely of the sweep and having a plurality of cut-outs formed to outline different characters and disposed in a circle concentric with the beam sweep and out of the normal path of the beam on said plate, a pair of concentric deflecting electrodes for producing a radial static field to divert the beam from said normal path into a path over said circle of cut-outs; said system further comprising circuit means connected to said concentric electrodes for control of said radial field in response to the received signals to divert the beam once during each sweep in phase with each impulse for passing the beam successively through corresponding cut-outs thereby shaping the cross section of the beam into the successive characters of the message.

10. A high speed signal receiving system for receiving signals of constant frequency and with each signal cycle including only one impulse phased differently in successive cycles to represent corresponding characters of a message, said system including a cathode ray tube in accordance with claim 4, selecting circuit means connected to said selecting electrodes to establish a radial static field between them in response to each impulse for effecting the selective and momentary deflection of said beam for display of a character stencil disposed at an angle of the sweep corresponding to the phase of the impulse, constant potential circuit means connected to said centering electrodes for establishing an adjustable constant radial static field between them, impulse storing circuit means connected to said spacing electrodes and including capacitance means for storing energy from the impulses of a group of successive signal cycles to establish a linear static field between said spacing electrodes and to vary the intensity of said linear field step by step by successive impulses for the spacing of the displayed characters along said line, said impulse storing circuit further including gas-filled space discharge means responsive to a maximum voltage on said capacitance to become fired and restore the voltage on said capacitance for a new series of step-by-step charges and for displaying a next succeeding group of characters along the same said line on said reading screen.

11. A high speed transmission system which comprises a sending station for sending short impulses each selectively phased within a signal cycle and at constant signal frequency, a receiving station for reception of said phased impulses and optical recording of corresponding characters at speeds beyond readability, and a carrier frequency channel connected between said stations and including circuit means for synchronization; said receiving station including a cathode ray tube for producing optical images of said characters in quick succession and in spaced relation along a recording line, optical recording means having a light sensitive recording strip for fast recording of said images and uniformly moving to record characters in successive spaced recording lines, and control circuit means for impressing incoming impulses upon said tube and for control of the recording; said tube being adapted to produce a focussed electron beam with a fixed circular sweep having each rotation in phase with a signal cycle, and said tube comprising a reading screen with an image persistence longer than a signal cycle, an opaque stencil plate having different character stencils cut along a circle concentric with and outside the fixed beam sweep and disposed at different phase angles of the beam rotation, concentric electrodes for establishing a variable radial static field to momentarily deflect the beam in phase with each impulse and pass it through a correspondingly phased stencil for display of corresponding characters on said reading screen, centering electrodes for establishing a fixed radial static field to deflect the beam from said stencil plate toward the center of said reading screen, and spacing electrodes for establishing a variable linear static field to deflect the beam for successive display of said images in spaced relation along a line across said reading screen; said control circuit means including spacing circuit means connected to impress a variable voltage upon said spacing electrodes and including capacitance means adapted for accumulative variation of its voltage from an initial value once for each signal cycle to effect a substantially uniform image spacing on said screen, and also including a space discharge device repeatedly responsive to a predetermined voltage on said spacing electrodes to restore said voltage to its initial value for repeated display of images along the same line on said screen; the operating speed of said system for recording of characters being limited only by the intensity and duration of said images and the sensitivity of said recording strip.

12. In a high speed printing telegraph system, a sending station for sending signals of a constant frequency and having one impulse in each cycle and having the impulses differently phased in successive cycles to represent different characters of a message, a receiving station for reception and optical recording of said signals at speeds beyond readability, a carrier frequency transmission channel interconnecting said stations and including circuit means for establishing synchronism between them at the signal frequency; said receiving station including a cathode ray tube for producing optical images of the individual characters in quick succession and in spaced relation along a recording line in response to incoming signals, optical recording means having a light sensitive recording strip for fast recording of said images and continuously moving at uniform speed to record characters in successive spaced recording lines transverse of said strip, and control circuit means for impressing incoming signals upon said tube for control of the recording; said tube being adapted to produce a focussed electron beam with a fixed circular sweep having each sweep cycle in phase with a corresponding signal cycle, and said tube comprising a reading screen for producing optical images of the beam and having an image persistence of more than one sweep cycle, an opaque stencil plate having a plurality of stencil cuts with contours of different characters disposed at different phase angles in a circle concentric with and outside the fixed sweep circle on said plate for shaping the beam cross section in passing the beam to said reading screen, a pair of concentric selecting electrodes connected to said control circuit means and disposed to momentarily deflect the beam in response to each impulse for passing the beam through a stencil cut disposed at a phase angle of the sweep cycle equal to the phase angle of the impulse within the signal cycle, a pair of centering electrodes for deflecting the modified beam toward the center of said reading screen and connected to a source of fixed potential, and a pair of spacing electrodes for establishing a variable linear static field to deflect the centered beam for successive display of said images in spaced relation along a line across said reading screen; said control circuit means including spacing circuit means connected to impress a voltage upon said spacing electrodes, and adapted to vary said voltage in steps once for each signal cycle for establishing said variable field.

13. A high speed printing telegraph recorder comprising a cathode ray tube including a focussing beam gun for producing a beam with a circular sweep of one rotation for each incoming character signal and in predetermined phase relation thereto, a fluorescent reading surface, an opaque stencil plate across the circular sweep of said beam having different character stencil cutouts arranged concentrically with and adjacent to the path of said beam and at different phase angles of the beam rotation, and deflecting electrodes arranged concentrically with said path and responsive to an impulse in each signal of predetermined phase within the signal cycle to deflect the beam radially at a corresponding phase angle to pass the beam through a selected stencil cut-out for producing an image of the character represented by the incoming signal, said recorder further comprising a camera for recording said image on a sensitized recording surface.

14. A cathode ray tube adapted to normally produce a beam with a circular sweep of constant frequency under control by a sweep circuit comprising a reading surface disposed at the end of said tube, an opaque stencil plate arranged transversely of said beam in front of said surface and having a plurality of cut-outs formed to represent different symbols and disposed in a circle concentric with and beyond the beam sweep, and a pair of concentric deflecting electrodes connected in an input circuit to be responsive to incoming signal impulses of constant frequency and differing phase angles for selectively diverting the beam from its circular path on said plate to pass it through any one of said cut-outs for luminous display of the corresponding symbol on said surface, said cut-outs having contours to form the symbols of a desired alphabet and adapted to correspondingly limit and shape the cross-sectional area of the beam passing through said cut-outs for production of successive different images of the cut-outs upon said surface during corresponding successive sweeps.

15. A method of high speed recording of signals which comprises the steps of synchronizing the cyclic sweep of an electron beam in a cathode ray tube with the normal cycle of incoming signals, impressing the incoming signals upon said beam for momentarily deflecting the beam from its normal sweep in phase with differently phased impulses of the signals for successive selection of a plurality of differentiated beam shaping means, one at a time, and recording the successive images of the shaped beam as they appear on the reading surface of the tube.

16. A method of high speed recording of signals which comprises the steps of synchronizing the cyclic sweep of an electron beam in a cathode ray tube with the normal cycle of incoming signals, impressing the incoming signals upon the beam for momentarily deflecting the beam from its normal sweep in phase with differently phased impulses of the signals for correspondingly shaping the cross-section of the beam, focussing the shaped beam upon the same spot on the reading surface of the tube after deflection of the beam at any phase angle, and impressing the incoming signals upon the focussed beam for spacing of the successive images of the shaped and focussed beam along a transverse line on the reading surface of the tube.

HARRY A. BURGESS.